(12) United States Patent
Chhaya et al.

(10) Patent No.: US 10,755,447 B2
(45) Date of Patent: Aug. 25, 2020

(54) MAKEUP IDENTIFICATION USING DEEP LEARNING

(71) Applicant: Adobe Inc., San Jose, CA (US)

(72) Inventors: Niyati Himanshu Chhaya, Hyderabad (IN); Nitin Rathor, Kapurthala (IN); Lilly Kumari, Patna (IN); Vineet Vinayak Pasupulety, Bangalore (IN); Rutuj Jugade, Bangalore (IN)

(73) Assignee: Adobe Inc., San Jose, CA (US)

(*) Notice: Subject to any disclaimer, the term of this patent is extended or adjusted under 35 U.S.C. 154(b) by 222 days.

(21) Appl. No.: 15/994,837

(22) Filed: May 31, 2018

(65) Prior Publication Data

US 2019/0325616 A1    Oct. 24, 2019

(51) Int. Cl.
| | | |
|---|---|---|
| *G06T 11/00* | (2006.01) | |
| *G06T 7/00* | (2017.01) | |
| *G06N 3/02* | (2006.01) | |
| *G06K 9/00* | (2006.01) | |

(52) U.S. Cl.
CPC ........ *G06T 11/001* (2013.01); *G06K 9/00261* (2013.01); *G06K 9/00281* (2013.01); *G06N 3/02* (2013.01); *G06T 7/97* (2017.01)

(58) Field of Classification Search
CPC ............ G06K 9/00281; G06K 9/00261; G06T 11/001; G06T 7/97; G06T 11/60; G06T 19/20; G06N 20/00; G06N 3/02

USPC ................. 382/118, 159, 218, 305
See application file for complete search history.

(56) References Cited

U.S. PATENT DOCUMENTS

| | | | | |
|---|---|---|---|---|
| 10,339,685 | B2 * | 7/2019 | Fu | ................ G06K 9/00671 |
| 2019/0014884 | A1 * | 1/2019 | Fu | .................. G06T 1/0007 |
| 2019/0362134 | A1 * | 11/2019 | Kim | ................ G06K 9/6271 |

OTHER PUBLICATIONS

"TAAZ Virtual Makeover & Hairstyles—Get a new look with makeup tips to stay in style", Retrieved at: http://www.taaz.com/— on Jan. 5, 2018, 2 pages.

(Continued)

*Primary Examiner* — Daniel G Mariam
(74) *Attorney, Agent, or Firm* — SBMC

(57) ABSTRACT

Makeup identification using deep learning in a digital medium environment is described. Initially, a user input is received to provide a digital image depicting a face which has a desired makeup characteristic. A discriminative neural network is trained to identify and describe makeup characteristics of the input digital image based on data describing differences in visual characteristics between pairs of images, which include a first image depicting a face with makeup applied and a second image depicting a face without makeup applied. The makeup characteristics identified by the discriminative neural network are displayed for selection to search for similar digital images that have the selected makeup characteristic. Once retrieved, the similar digital images can be displayed along with the input digital image having the desired makeup characteristic.

20 Claims, 9 Drawing Sheets
(4 of 9 Drawing Sheet(s) Filed in Color)

(56) References Cited

OTHER PUBLICATIONS

Chen, "Automatic Facial Makeup Detection with Application in Face Recognition", Appeared in Proc. of 6th IAPR International Conference on Biometrics (ICB), Jun. 2013, 8 pages.
Guo, "Face Authentication with Makeup Changes", Aug. 29, 2013, 11 pages.
Hand, "Attributes for Improved Attributes: A Multi-Task Network for Attribute Classification", Apr. 25, 2016, 16 pages.
Wang, "Face Behind Makeup", Proceedings of the Thirtieth AAAI Conference on Artificial Intelligence (AAAI-16), Feb. 21, 2016, 7 pages.

\* cited by examiner

800

802
Receive a plurality of pairs of digital images depicting faces, each pair comprising a first image without makeup depicted on a face and a second image with makeup depicted on a face

804
Generate training data describing a difference in visual characteristics between the first and second images of the pairs

806
Provide the training data as input to a makeup discrimination network to train the makeup discrimination network to identify and describe makeup characteristics of faces depicted in digital images based on the differences in visual characteristics described by the training data

808
Output the trained makeup discrimination network for use by an application to generate data describing the makeup characteristics of a face depicted in an input digital image

*Fig. 8*

MAKEUP IDENTIFICATION USING DEEP LEARNING

RELATED APPLICATION

This application claims priority under 35 USC 119 or 365 to India Application No. 201811014802, filed Apr. 19, 2018, the disclosure of which is incorporated by reference in its entirety.

BACKGROUND

Content management systems continue to make advances in computing technologies enabling client device users to enhance faces in digital images in various ways which were largely limited to professional photographers in the past. As one example, these systems enable client device users to apply cosmetic modifications to digital images which depict a face, even though these users have little to no experience or knowledge of rules for applying cosmetic modification to digital images. Many of these systems include functionality that supports application of makeup to a digital image depicting a face. However, these conventional techniques are implemented using systems that fail to provide functionality that supports detecting whether makeup is present in a digital image depicting a face. Conventional systems for images searches fail to provide functionality to search for images that depict a desired characteristic of makeup in a digital image. Instead, these systems allow client device users to search images for makeup based on text-based search queries. Such systems may not return suitable search results, however

SUMMARY

To overcome these problems, makeup identification using deep learning is leveraged in a digital medium environment. Initially, an input digital image (e.g., an image depicting a face with makeup applied) is selected via a user interface. This input digital image is provided as input to a makeup identifier which leverages a trained makeup discrimination network (e.g., a discriminative neural network) to identify and describe makeup characteristics of the input digital image. To generate data describing such makeup characteristics, the makeup discrimination network is trained, using training data that describes differences in visual characteristics of image pairs, where each image pair includes an image of a face with makeup applied and an image of a face without makeup applied. In addition to describing makeup characteristics of a depicted face, the makeup identifier leverages selected makeup characteristics of the input digital image to generate search requests for similar images. A response to the request is received that includes at least one similar image having the selected makeup characteristic. Once this response is received, the makeup identifier is able to output the input digital image and the similar image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 depicts a procedure in an example implementation in which a network is trained using deep learning to identify and describe makeup characteristics of digital images based on a difference in visual characteristics between before-makeup images and after-makeup images.

DETAILED DESCRIPTION

Overview

Figure 1:
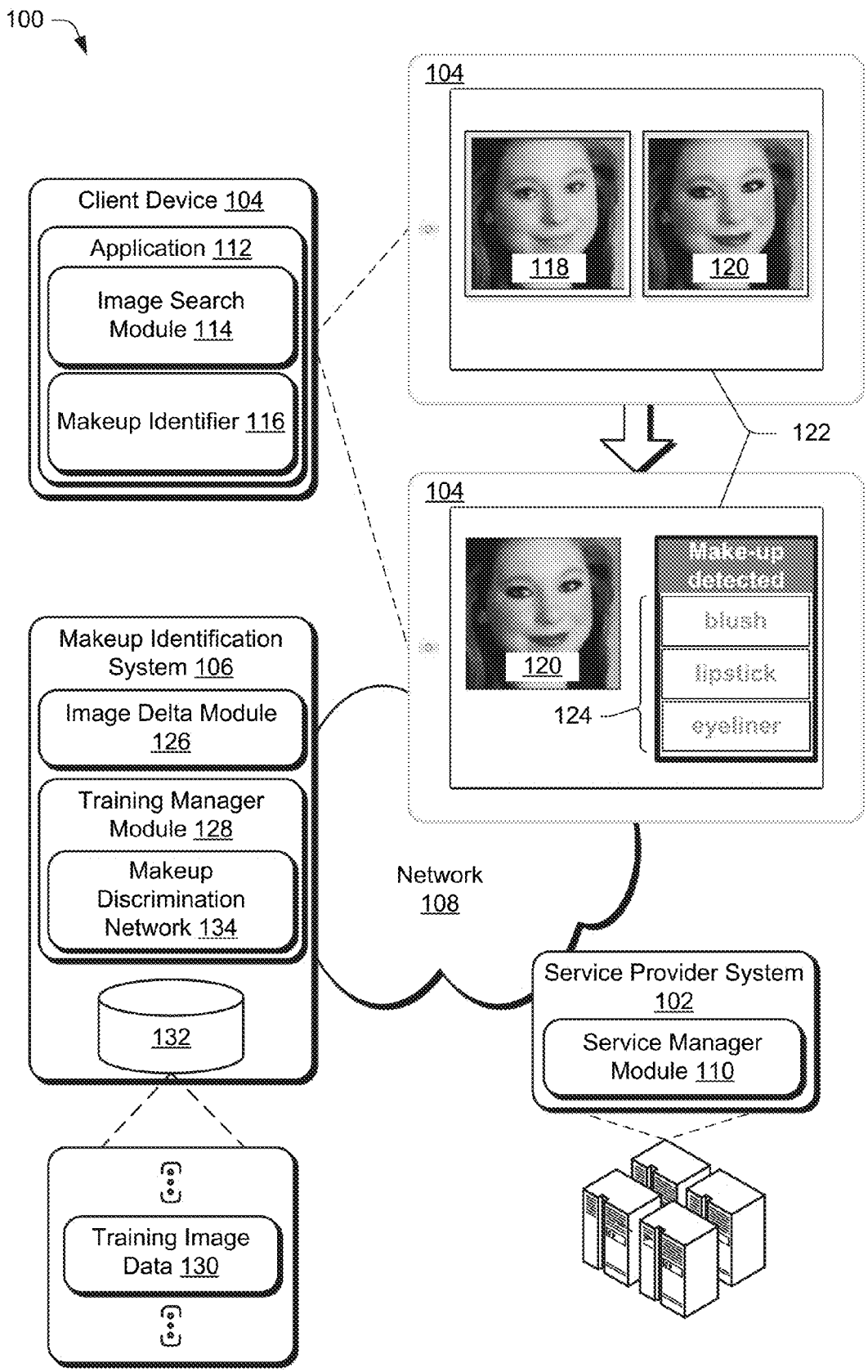
FIG. 1 is an illustration of an environment in an example implementation that is operable to employ techniques for makeup identification using deep learning as described herein.

In some cases, client device users attempt to identify the presence or absence of makeup on a face depicted in a digital image. Such identification can be used by a client device user, for instance, to modify a digital image with an image editing application to include desired makeup features. Additionally, a vast amount of digital image content depicting faces is available to users, but conventional systems search digital image content by matching text-based queries to text-based tags associated with the digital image content. However, these systems may not be able to interpret fine-grained concepts conveyed visually through makeup features of an image using words of these text-based queries. Consequently, conventional systems may not show users, that search for images depicting a desired makeup characteristic, images that match the characteristics desired by the user.

To overcome these problems, makeup identification using deep learning is leveraged in a digital environment. Initially, a digital image depicting a face is received. This can occur in a scenario where a client device user captures or selects the digital image, which depicts a face having a desired makeup characteristic. In some implementations, the digital image is received in conjunction with a second digital image lacking the desired makeup characteristic, e.g., an image depicting a face before application of makeup. Regardless, the digital image having the desired makeup characteristic is provided to a makeup identification system. Digital images can be provided to the makeup identification system based on a variety of other operations without departing from the spirit or scope of the described techniques.

In general, the makeup identification system includes or has access to a makeup identifier configured to identify and describe makeup characteristics of faces depicted in input digital images. In one or more implementations, the makeup identifier is configured to have a discriminative neural network trained using deep learning techniques. By way of example, the discriminative neural network is configured as a convolutional neural network. In accordance with the described techniques, the discriminative neural network is trained to identify and describe makeup characteristics in digital images depicting faces. The discriminative neural network is trained using data that describes differences between a set of image pairs. In particular, the data describes a difference between visual characteristics (e.g., pixel values) of pairs that include an image before application of makeup and an image after application of makeup. In one or more implementations, each of these pairs is also associated with tags indicating types of makeup depicted on the face in the after image. By training the discriminative neural network using data describing the difference between the before- and after-makeup images, rather than training the network using the images themselves, the makeup identification system uses fewer computing resources in connection with the training and is able to suitably train the network in a shorter amount of time than conventional techniques. Consider an example where a before- and after-makeup image each include three channels of pixel data, e.g., to describe the images in terms of RGB. In this example, inputting the image pair to the network involves inputting six channels of pixel data. In contrast, the described system provides three channels of delta values describing the differences in pixel data as input to the network.

Additionally, the discriminative neural network outputs multi-label classifications, which describe makeup characteristics for input digital images. These multi-label classifications can include several labels indicative of different types of makeup (e.g., lipstick, eyeliner, blush, and so on) and, as output by the discriminative neural network, indicate a presence or absence of the associated type of makeup in an input digital image. In one or more implementations, the discriminative neural network initially outputs data describing a probability that the face depicted in the input digital image includes a makeup type indicated by each makeup label. This probability data may then be used to determine a presence or absence of each of the makeup types indicated by the different makeup labels, e.g., if the discriminative neural network outputs a probability of 0.51 that there is eyeliner on a depicted face, a label indicating the presence of eyeliner may be associated with the input digital image, whereas if a probability of 0.49 is output, a label indicating the absence of eyeliner may be associated with the input digital.

From the trained network, the makeup identifier receives the data describing makeup characteristics for the input digital image. In one or more implementations, the identified makeup characteristics are displayed via a user interface for selection (e.g., makeup labels corresponding to the makeup characteristics are displayed), along with the input digital image having the identified makeup characteristic. In response to receiving a selection of a makeup characteristic (e.g., via the user interface), the makeup identifier can display additional data (e.g., a hexadecimal color code) describing the selected makeup characteristic in some implementations.

Furthermore, the described techniques may also enable a user to specify an identified makeup characteristic to conduct an image search based on the selected characteristic—rather than attempt to search a repository of digital images using a text-based query. In response to a selection to conduct an image search, the makeup identifier generates an image search request with data describing the selected makeup characteristic. By way of example, the image search request may be generated to include a color, label, and/or facial location of a selected makeup characteristic. In response to the image search request, the makeup identifier receives a similar image having the selected makeup characteristic, e.g., from an image-search web service. The makeup identifier outputs the similar image having the selected makeup characteristic (e.g., via the user interface). In some implementations, the makeup identifier may also output the input digital image. This enables a user to obtain a variety of digital images having a desired makeup characteristic by simply inputting one digital image with the desired makeup characteristic. Rather than requiring users to describe desired makeup characteristics using text-based parameters and/or spend a great amount of time searching for similar images, the described techniques improve user-interface interactions by simply allowing users to input an image as a search query.

Consider an example scenario in which a user provides input to upload or select (e.g., from storage or a social networking platform) an image depicting her own face without makeup and an image depicting a friend's face with blue eye shadow, pink blush, and red lipstick. In response to receiving this input, the digital image of the friend is provided to the makeup identifier. The image depicting the friend is displayed via the user interface along with makeup labels indicating that eye shadow, blush, and lipstick are identified in the image depicting the friend. In response to user selection of the lipstick label, the shade of red depicted in the lipstick (e.g., as described by the makeup characteristics) is displayed via the user interface along with the makeup labels and the image of the friend. Next, the user provides an input to view similar images to the selected shade of red lipstick. In response to the input, the makeup identifier displays a group of five similar digital images which depict faces having a similar or same shade of red lipstick. Consequently, by simply inputting the digital image of the friend, the user is able to receive digital images that depict red lipstick, which is similar to the red lipstick depicted in the image of the friend In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques for makeup identification using deep learning as described herein. The illustrated environment 100 includes a service provider system 102, client device 104, and makeup identification system 106 that are communicatively coupled, one to another, via a network 108.

Computing devices that are usable to implement the service provider system 102, the client device 104, and the makeup identification system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 9.

The service provider system 102 is illustrated as including a service manager module 110 that is representative of functionality to provide services accessible via the network 108 to client device users. The service manager module 110, for instance, may expose content or functionality that is accessible via the network 108 by an application 112 of the client device 104. The application 112 may be configured as a network-enabled application, a browser, a native application, and so on, that obtains data from the service provider system 102 via the network 108. This data can be employed by the application to enable a user of the client device 104 to communicate with the service provider system 102, such as to receive application updates and features when the service provider system 102 provides functionality to manage content editing applications.

In the context of the described techniques, the application 112 includes functionality to leverage digital content, such as digital images. To enable image searches, for instance, the application 112 includes image search module 114. In the illustrated example, the application 112 also includes makeup identifier 116 that is implemented at least partially in hardware of the client device 104, in part, to identify makeup depicted in digital images. Broadly, "makeup" refers to cosmetic modifications applied to a face. In the context of the described techniques, makeup depicted in digital images may be applied physically (e.g., to a face using a physical product and then captured with an image sensing device) or digitally (e.g., as digital graphic additions to a digital image depicting a face).

In the illustrated example 100, the client device 104 is shown displaying, at a first stage, a before image 118 and an after image 120 via display device 122. The makeup identifier 116 is configured to identify makeup characteristics 124 of the after image 120. The makeup characteristics 124 identified in the after image 120 are displayed at a second stage via the display device 122. In one or more implementations, the makeup identifier determines values for the corresponding makeup characteristics 124 with neural networks trained using deep learning, e.g., discriminatory convolutional neural networks. The makeup identifier 116 determines these values in substantially real-time to generate data describing the makeup characteristics 124. In other words, the makeup identifier 116 may be configured as a fully convolutional end-to-end neural network that takes as input data describing the before image 118 and the after image 120 and outputs the makeup characteristics 124. The makeup characteristics 124 represent output of a trained neural network and describe characteristics of makeup depicted by an input digital image. By way of example, the makeup characteristics 124 can describe at least one of a facial location of makeup, a color of makeup, and tags associated with makeup depicted in a digital image.

To provide the client device 104 with the application 112 having the makeup identifier 116, the service provider system 102 may leverage the makeup identification system 106. Although functionality of the makeup identification system 106 is illustrated as separate from the service provider system 102, this functionality may also be incorporated as part of the service provider system 102, further divided among other entities, and so forth. Additionally or alternately, an entirety or portions of the functionality of the makeup identification system 106 may be incorporated as part of the client device 104. The makeup identification system 106 includes an image delta module 126 and a training manager module 128. The image delta module 126 is implemented at least partially in hardware of a computing device, in part, to generate training image data 130, which is illustrated as stored in storage 132. The image delta module 126 generally represents functionality to convert image pairs of digital images depicting a same face before and after makeup into data describing a difference (e.g., delta values) between the before and after images of the image pair. Thus, the training image data 130 represents data describing a difference in visual characteristics (e.g., pixel values) between a pair of images depicting the same face before and after application of makeup.

The training manager module 128 is implemented at least partially in hardware of a computing device, in part, to deploy deep learning to generate a makeup discrimination network 134 from the training image data 130. The makeup discrimination network 134 represents functionality to detect whether data representing visual characteristics of a pair of images is indicative of makeup depicted in at least one of the digital images. In operation, the makeup discrimination network 134 generates the makeup characteristics based on data describing a difference in visual characteristics between input digital images, e.g., data describing a difference in visual characteristics between the before image and the after image 120.

With regard to network architecture, the training manager module 128 is capable of generating the makeup discrimination network 134 to have convolutional layers stacked in increasing depth, followed by fully connected layers and a softmax classifier. The training manager module 128 is also configured to use a sigmoid classifier as the output layer for the makeup discrimination network 134. The makeup discrimination network leverages the sigmoid classifier to produce a multi-label classification of the data describing visual characteristics of an input digital image. This multi-label classification is used to generate the makeup characteristics 124. For instance, a makeup label represents one particular type of makeup (e.g., lipstick, eyeliner, eye shadow, foundation, and so forth). By employing the sigmoid classifier, the makeup discrimination network 134 generates a value for each makeup label predicting a probability that the corresponding makeup is depicted in an input digital image. Thus, the makeup characteristics 124 may include a set of values describing a probability that each makeup label is depicted in the input digital image.

In contrast to conventional techniques, the training manager module 128 configures the makeup discrimination network 134 so that data describing each of two images is not received as input. Instead, the training manager module 128 configures the makeup discrimination network 134 to receive as input data describing a difference in values between the two images, e.g., delta values. By receiving the delta values, the training manager module 128 uses fewer hardware resources than conventional techniques to train the networks, e.g., three channels for delta values of pixels instead of six channels for pixel values.

The makeup identification system 106 provides a variety of advantages by leveraging the makeup discrimination network 134 to generate the makeup characteristics for the after image 120 in this way. By way of example, the makeup identification system 106 reduces an amount of time it takes to train a neural network to detect whether data representing visual-characteristic differences between a pair of images corresponds to makeup depicted in at least one of the images. The makeup identification system 106 also uses fewer hardware resources than conventional techniques, e.g., by reducing computational complexity associated with makeup identification. The described makeup identification system 106 is thus more efficient than conventional systems that identify makeup depicted by digital images. Additionally, the makeup characteristics 124 enable an image search for images depicting similar makeup.

Having considered an example environment, consider now a discussion of some example details of the techniques for makeup identification using deep learning in a digital medium environment in accordance with one or more implementations.

Makeup Identification

Figure 2:
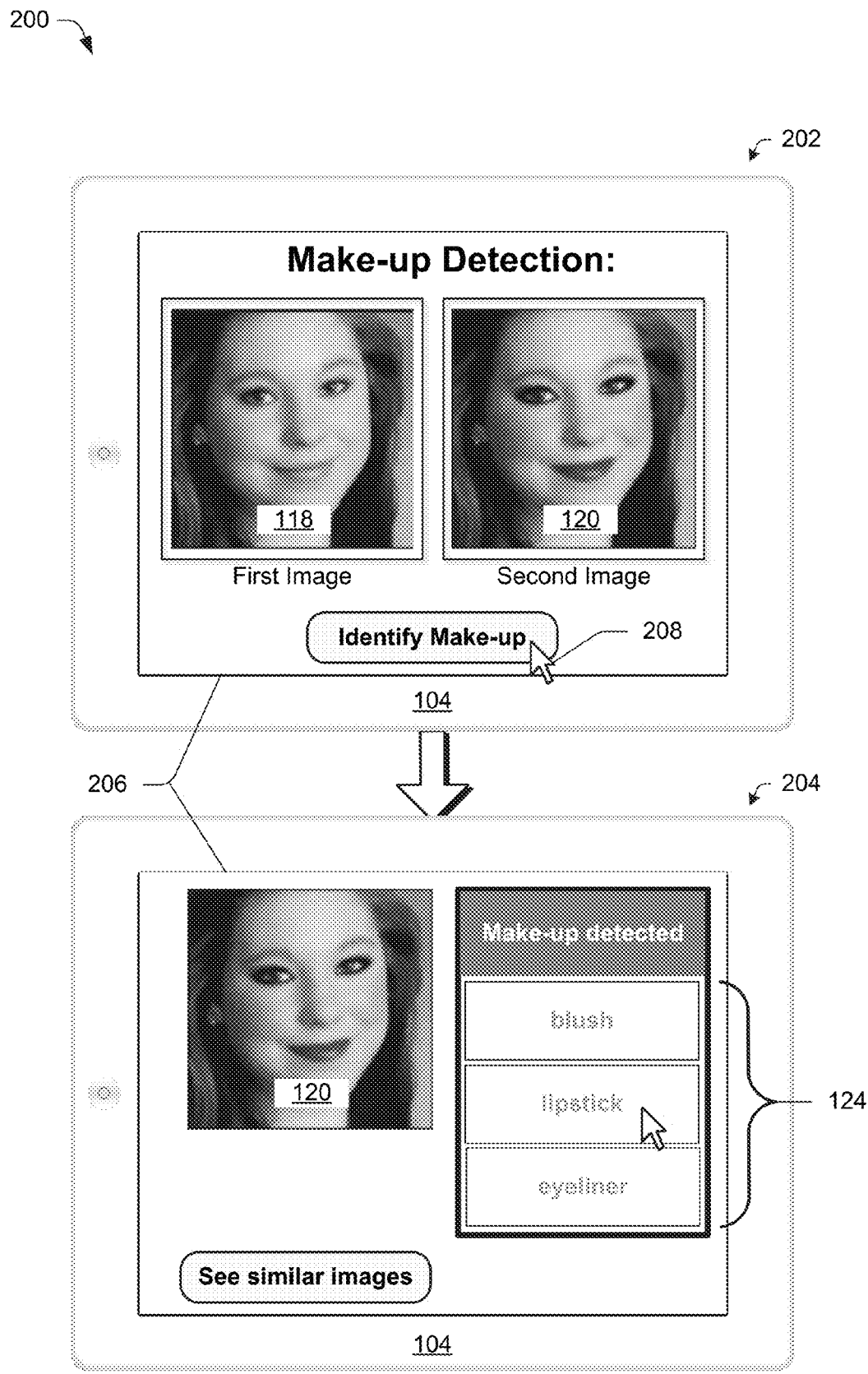
FIG. 2 depicts an example of an input pair of a before and an after image and makeup identification for the input after image.

FIG. 2 depicts an example 200 of an input pair of a before and an after image and makeup identification for the input after image. The illustrated example 200 includes the client device 104 of FIG. 1. The example 200 further depicts the client device 104 in two different stages—a first stage 202 and a second stage 204. In each of the first and second stages 202 and 204, the client device 104 is depicted displaying a user interface 206 that facilitates makeup identification. By way of example, the user interface 206 includes different instrumentalities presented at the different depicted stages 202, 204 that prompt the user of the client device 104 to provide input for makeup identification. Further, selections made by the user of the client device 104 are received as some form of user input (e.g., touch, voice, stylus, mouse, etc.) in relation to the user interface 206 (and the presented instrumentalities of the different stages).

In the first stage 202, the client device 104 is depicted displaying the before image and the after image 120, which a user of the client device 104 may select as input. It should be appreciated that while the before image 118 and the after image 120 are depicted as representing the same person (e.g., subject), a user of the client device may provide images representing different people as the before image 118 and the after image 120.

The makeup identifier 116 is configured to receive the before image 118 and the after image 120, as shown in FIG. 1, and output the makeup characteristics 124. Consider the illustrated example 200 in accordance with one or more implementations. In this example, a user of the client device 104 has selected for input the before image 118 and the after image 120, and these images depict a same face without and with makeup, respectively. In response to receiving the user input 208, the client device 104 displays the makeup characteristics 124 in substantially real-time via the user interface 206 proximate the after image 120. In this example, the makeup characteristics 124 indicate identification by the makeup identifier 116 of blush, lipstick, and eyeliner. While the example 200 depicts display of the makeup characteristics 124 that are identified, it should be understood that the makeup characteristics 124 may also include labels which indicate makeup that is not identified in the after image 120. By way of example, the makeup characteristics 124 may include labels that indicate a lack of lipliner, eye shadow, and foundation. Thus, the techniques described herein enable detection of both the presence and absence of makeup in a digital image.

Figure 3:
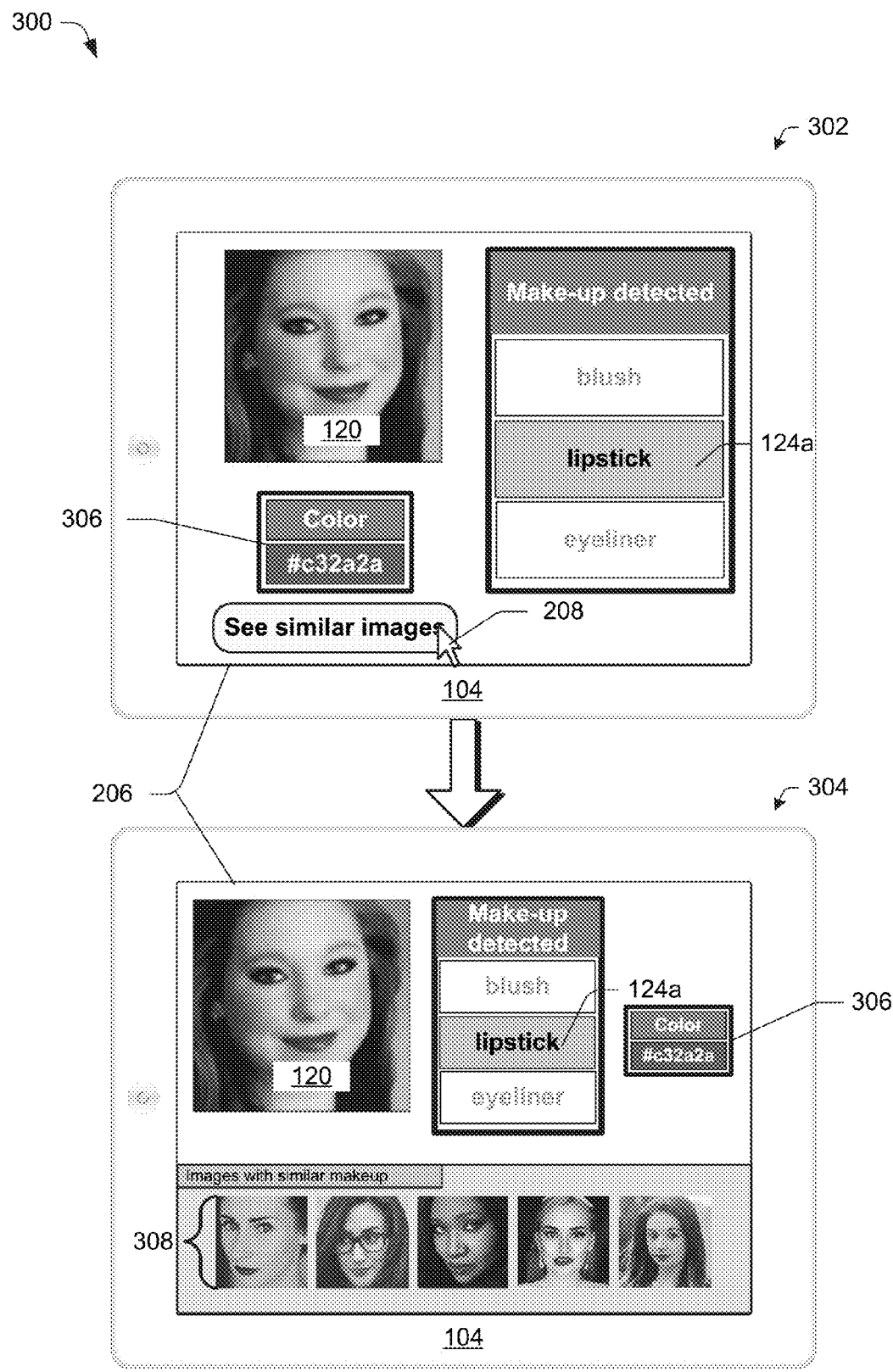
FIG. 3 depicts an example of an image request and returned similar images.

FIG. 3 depicts an example 300 of an image request and returned similar images. The illustrated example 300 includes the client device 104 of FIG. 1. The example 300 further depicts the client device 104 in two different stages—a first stage 302 and a second stage 304. In each of the first and second stages 302 and 304, the client device 104 is depicted displaying the user interface 206 that facilitates makeup identification.

The client device 104 is depicted at stage 302 displaying the after image 120, the makeup characteristics 124, and makeup attribute 306. The makeup attribute 306 represents data describing a selected makeup characteristic 124a. In this example, a user of the client device 104 has selected the makeup characteristic 124a (lipstick). The makeup attribute 306 is displayed in the user interface 206 with further detail describing the selected makeup characteristic 124a. In this example, the makeup attribute 306 is indicative of a red color (# c32a2a) of the depicted lipstick. To view similar images having an attribute similar to the selected makeup characteristic 124a, a user of the client device 104 may provide the user input 208 via the illustrated instrumentality. Accordingly, the user input is received via the user interface 206 to view images having a makeup attribute that is similar to the selected makeup characteristic 124a.

At stage 304, the client device 104 is depicted displaying the after image 120, the makeup characteristics 124 (including an indication of the selected makeup characteristic 124a), the makeup attribute 306, and similar images 308. In response to receiving the user input 208 at stage 302, the makeup identifier 116 is configured to retrieve the similar images 308. As part of doing so, the makeup identifier 116 generates a search request which includes the selected makeup characteristic 124a. Based on the search request, a search service provider searches for images having the selected makeup characteristic 124a and returns identified images to the client device 104. In this way, the similar images 308 are received in response to an image search that is performed based on the selected makeup characteristic 124a which was identified from the after image 120. In the continuing example, the search request thus includes information indicative of red lipstick and the returned similar images 308 depict faces having red lipstick. Accordingly, the techniques described herein enable searching for digital images based on characteristics of makeup identified in an input digital image.

Figure 4:
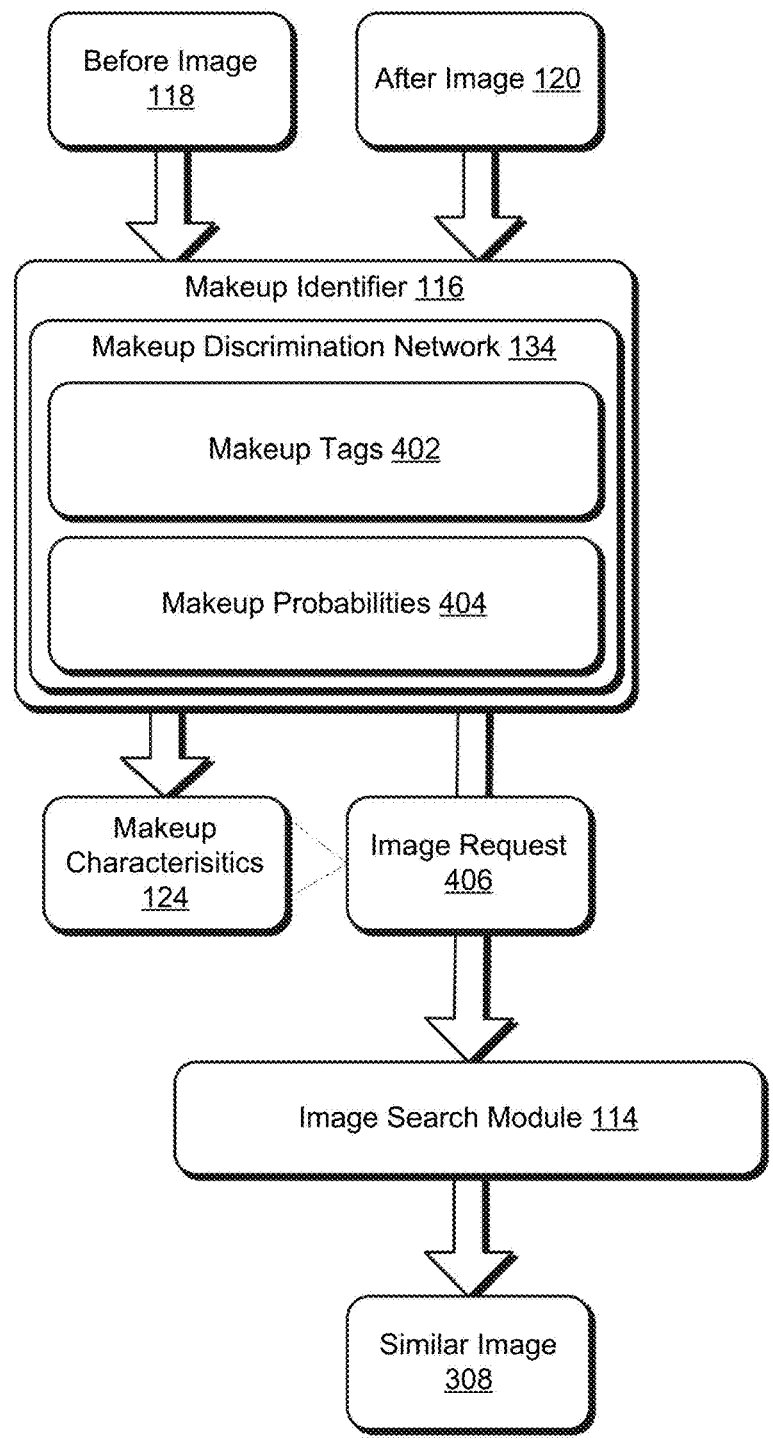
FIG. 4 depicts an example implementation of a makeup identification system to generate a description of makeup characteristics depicted in a digital image using a makeup discrimination network.

FIG. 4 depicts a system 400 in an example implementation in which a makeup identification system generates a description of makeup characteristics depicted in a digital image using a makeup discrimination network. In the illustrated example 400, the makeup identifier 116 is depicted including the makeup discrimination network 134. As indicated above, the training manager module 128 of the makeup identification system 106 generates and trains the makeup discrimination network 134.

In this example 400, the makeup identifier 116 is shown obtaining the before image 118 and the after image 120. The makeup identifier 116 generates data describing visual characteristics of the before image 118 and the after image 120. Additionally, the makeup identifier 116 determines a difference in visual characteristics between these images by computing a difference in pixel values of the before image 118 and the after image 120. Further, the makeup identifier 116 generates data describing the visual characteristics and/or the determined difference.

The makeup identifier 116 provides the data describing visual characteristics of the before image 118 and the after image 120 as input to the makeup discrimination network 134. From this input data, the makeup discrimination network 134 is trained to generate output data that includes the makeup characteristics 124. In particular, the makeup discrimination network 134 determines the makeup characteristics 124 based on makeup tags 402 and makeup probabilities 404 learned during training. These makeup tags and makeup probabilities 404 are learned during training from exposure to data describing before/after makeup digital image pairs and differences between them.

Broadly speaking, the makeup tags 402 comprise text representations of makeup labels that are associated with the data describing before/after makeup digital image pairs used to train the makeup discrimination network 134. For example, the makeup tags 402 include text strings describing visual characteristics of makeup identified during training, such as text strings indicative of lipstick, lipliner, eye shadow, eyeliner, foundation, blush, and so forth. In this example, each of lipstick, lipliner, eye shadow, eyeliner, foundation, and blush represents a single makeup tag 402. The makeup probabilities 404 represent values that correspond to a likelihood that the makeup indicated by each of the makeup tags 402 is identified as present in the after image 120. The makeup discrimination network determines these makeup probabilities 404 based on a similarity of the input data, describing the before and after images, with the data describing before/after makeup digital image pairs used for training. In one or more implementations, the makeup probabilities are associated with threshold values for applying the makeup tags 402, such that if the makeup discrimination network 134 computes a given makeup probability and this probability exceeds the associated threshold then the makeup discrimination network 134 applies the respective makeup tag 402. To this end, in at least some implementations, the makeup probabilities 404 are used to convert probability values associated with the makeup tags 402 into binary values indicating a presence or absence of the corresponding makeup in the after image 120.

The makeup discrimination network 134 utilizes the makeup tags 402 and the makeup probabilities 404 to generate the makeup characteristics 124. The makeup characteristics 124 can also include data further describing a presence or absence in an image of makeup associated with the makeup tags 402. By way of example, the makeup characteristics 124 may include data that describes a face location (e.g., lips, cheeks, eyelids) and color in addition to describing presence of the makeup in the after image 120. As introduced above, the makeup characteristics 124 are presented at the client device 104 proximate the after image 120.

In order to retrieve the similar image 308, an image request 406 is generated by the makeup identifier 116. In accordance with one or more implementations, the makeup identifier 116 is configured to receive an input (not shown) in connection with the image request 406. This input to initiate communication of the image request 406 includes a selection of at least one specified makeup characteristic 124. Responsive to the selection input, the makeup identifier 116 generates the image request 406, which describes one or more of the makeup characteristics 124 for which the similar image 308 is requested. For example, the image request 406 is generated to include data describing one or more of the makeup characteristics 124 selected by a user of the client device 104 via instrumentalities of the user interface 206. In one or more implementations, the image request 406 is communicated via the image search module 114 to the service provider system 102, while in other implementation, the image request 406 is communicated to the makeup identification system 106.

The image search module 114 is configured to identify the similar image 308 by comparing the data describing the selected makeup characteristics 124 to data describing digital images. In some implementations, the data describing the selected one or more of the makeup characteristics 124 is compared to the training image data 130. Techniques for determining the similar image 308 include various methods for determining similarity, such as Euclidian distance, cosine similarity, and so forth. Regardless of how the similarity is determined, the similar image 308 is retrieved in response to the image request 406. In addition or alternatively, a plurality of the similar images 308 are returned for display as depicted in FIG. 3.

Figure 5:
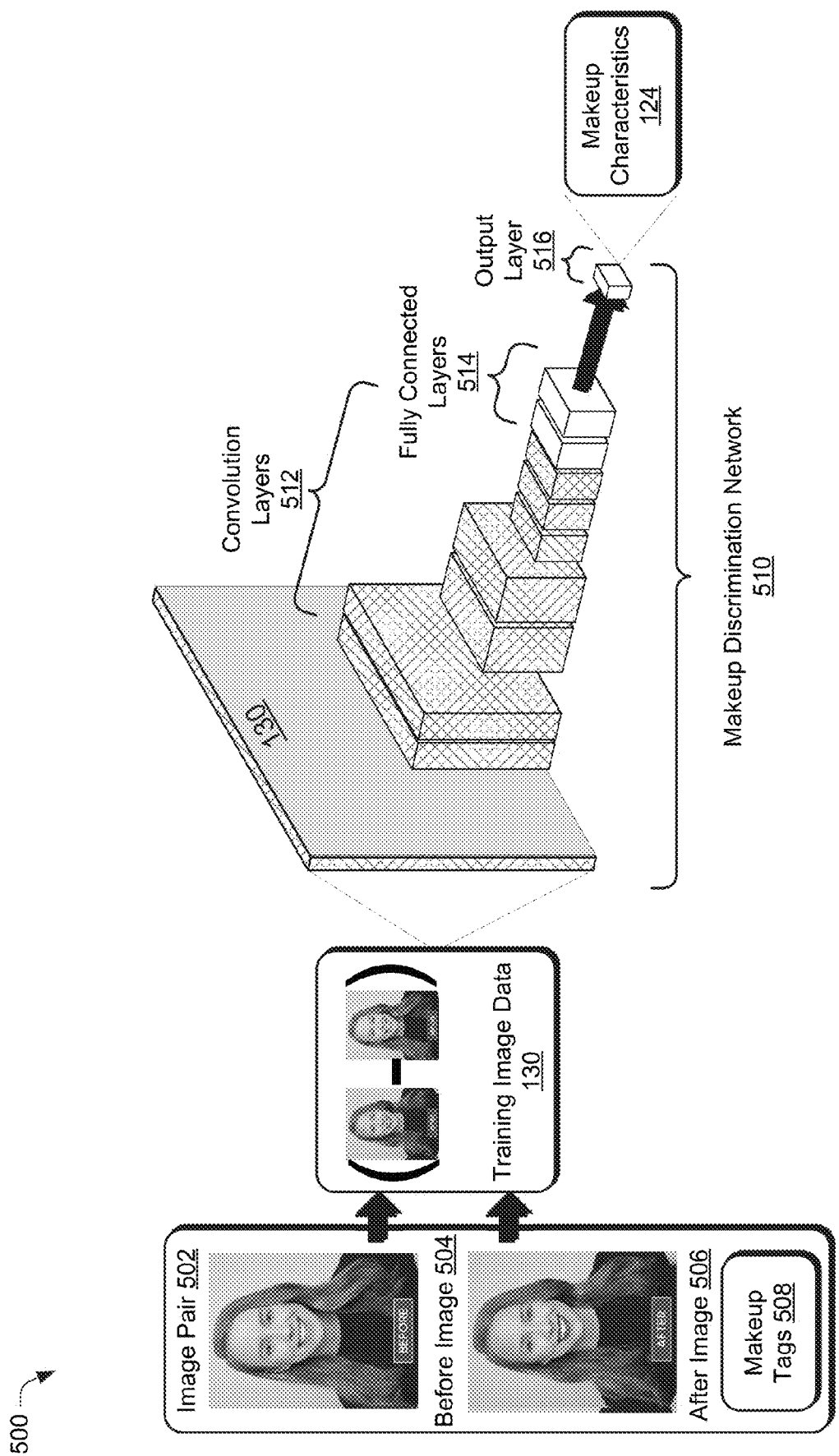
FIG. 5 depicts an example of an implementation of a makeup discrimination network trained using deep learning.

FIG. 5 depicts an example 500 of an implementation of a makeup discrimination network trained using deep learning. In accordance with the described techniques, the illustrated example 500 depicts a convolutional network framework for multi-label classification of data describing visual characteristics of an input digital image.

The illustrated example 500 includes image pair 502, which is depicted including before image 504, after image 506, and makeup tags 508. The before image 504 and the after image 506 represent digital images of a same person before and after application of makeup, respectively. The makeup tags 508 represent text-based data describing the makeup depicted in the after image 506. The training image data 130 is generated based on the data included in the image pair 502 and serves as input to a makeup discrimination network 510. By way of example, the training image data 130 is generated to describe a difference between visual characteristics of the before image 504 and visual characteristics of the after image 506. For instance, the training manager module 128 subtracts color values (e.g., 3-channel RGB pixel values) of the before image 504 from the color values of the after image 506. The training manager module 128 then generates the training image data 130 to describe a difference indicated by this subtraction.

In one or more implementations, the makeup discrimination network 134 is configured as and thus corresponds to the makeup discrimination network 510. In particular, the makeup discrimination network 134 corresponds to the makeup discrimination network 510 once suitably trained. The illustrated makeup discrimination network 510 includes convolution layers 512. In one or more implementations, the makeup discrimination network 510 is configured with seven 3×3 convolution layers 512 that are arranged in stacked blocks of two, two, and three, respectively. In addition to the convolution layers 512, the makeup discrimination network 510 also includes fully connected layers 514, as depicted. In one or more implementations, the fully connected layers 514 represent functionality to perform flatten operations and an additional convolution operation after the convolution layers 512. In accordance with the described techniques, the training manager module 128 generates the makeup discrimination network to use rectified linear unit (RELU) as an activation function.

The makeup discrimination network 510 is further illustrated having an output layer 516. In one or more implementations, the output layer 516 represents functionality to perform sigmoid activation on the output of the fully connected layers 514. By way of example, the output layer 516 performs sigmoid activation to generate the makeup probabilities 404. By performing this sigmoid activation, each value output by the output layer 516 is restricted to a probability value (e.g., between 0 and 1) representing a likelihood that the training image data depicts a particular type of makeup indicated by one of the makeup tags 402. In addition or alternatively, a threshold value for each makeup tag may be compared to the values output by the output layer 516 so that the probability values are converted to binary values representing a presence (1) or absence (0) of a respective makeup tag. In one or more implementations, the training manager module 128 uses one or more loss functions to train the makeup discrimination network 510, e.g., to compare the makeup tags selected by the makeup discrimination network to the makeup tags 508 of the image pair 502. For instance, the training manager module 128 trains the makeup discrimination network with a binary cross-entropy loss function that accounts for multi-label makeup classification. The training manager module 128 is further capable of training the network using additional loss functions in accordance with the principles described herein.

Figure 6:
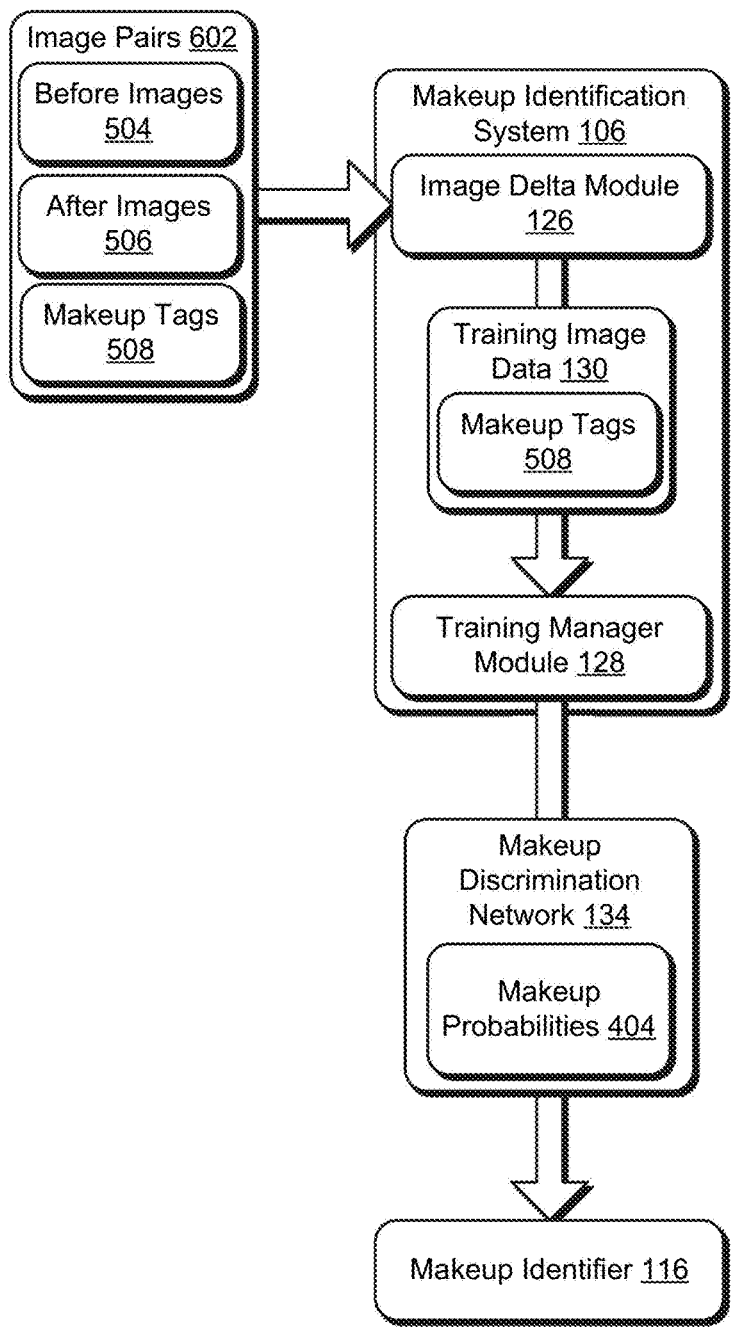
FIG. 6 depicts a system in an example implementation to train a makeup discrimination network to identify makeup characteristics depicted in an input digital image.

FIG. 6 depicts a system 600 in an example implementation in which the makeup identification system 106 of FIG. 1 trains a makeup discrimination network to identify the makeup characteristics 124 depicted in an input digital image. The illustrated system 600 is depicted with the image delta module 126 and the training manager module 128 of the makeup identification system 106 of FIG. 1.

In this example, the image delta module 126 is depicted obtaining image pairs 602. In one or more implementations, the image pairs 602 correspond to a plurality of the image pair 502, such that each of the image pairs 602 includes the before image 504, the after image 506, and the makeup tags 508. The before image 504 and the after image 506 of the image pairs 602 represent a first image without makeup depicted on a face and a second image with makeup depicted on the same face, respectively. In addition, the image pairs 602 include labels for makeup depicted in the second image, e.g., makeup tags 508. In one or more implementations, the image pairs 602 are obtained from an image database or an image repository, e.g., via the service provider system 102 over the network 108. While in other implementations, the image pairs 602 are stored in the storage 132.

The image pairs 602 are input to the image delta module 126 to generate the training image data 130. The training image data 130 describes delta values indicative of a difference in visual characteristics of the before images 504 and the after images 506. In some implementations, the training image data 130 for each image pair 602 is generated by calculating a difference between RGB pixel values between the before image 504 and the after image 506.

In some implementations, the image delta module 126 also pre-processes the image pairs 602 based on one or more criteria to normalize the image data. By way of example, the image delta module may normalize the image data by enforcing a size criteria, e.g., by cropping the image data. For instance, the image delta module 126 may enforce this size criteria by resizing the before images 504 and the after images 506 to 150×150 pixels. Resizing the image pairs 602 is one example, and various other pre-processing techniques may be applied to the image pairs 602 to generate the training image data 130 in accordance with the described techniques. In one or more implementations, for instance, the makeup identification system 106 includes or has access to a pre-trained frontal face detection network and/or a facial landmark detection network. Using these networks, the image delta module 126 crops and centers the faces in the image pairs 602 to generate the training image data 130 as part of the pre-processing.

As illustrated, the training image data 130 is input to the training manager module 128, which further generates the makeup discrimination network 134 using deep learning. The training manager module 128 may, for instance, train the makeup discrimination network 134 using the training image data 130 on an image-pair by image-pair basis. The training manager module 128 leverages deep learning techniques to train the makeup discrimination network 134 to learn a composite difference in visual characteristics between digital images depicting before makeup faces and after makeup faces for each makeup tag 508. To this end, the training manager module 128 trains the makeup discrimination network 134 to classify multiple makeup tags 508 using data describing differences in visual characteristics of faces—rather than the complete images. During this training, the makeup discrimination network 134 learns to generate predictions as to whether data describing a face depicted in a digital image corresponds to a makeup label. Broadly speaking, the makeup discrimination network 134 recognizes visual characteristics of faces depicted in digital images that are indicative of a presence or absence of various types of makeup.

By analyzing the training image data 130, the makeup discrimination network is configured to classify data describing the difference in visual characteristics in the image pairs 602. Additionally, the makeup discrimination network 134 labels this data based on the classification with a respective makeup label. As noted above, the training image data 130 generated from each of the image pairs 602 is input to the makeup discrimination network 134 and classified. The training manager module 128 is configured to compare the labels identified in accordance with this classification to the makeup tags associated with the respective image pair 602. The makeup probabilities 404 are generated by the makeup discrimination network 134 to perform this classification. Based on these comparisons, characteristics of the makeup discrimination network 134 (weights associated with layers) are adjusted to improve an ability of the network to identify and describe the makeup characteristics 124 of an input digital image, e.g., the after image 120.

Once the training manager module 128 has sufficiently trained the makeup discrimination network 134, the makeup discrimination network 134 may be packaged for use by the makeup identifier 116. By way of example, the makeup discrimination network may be packaged for use by the client device 104 and/or the application 112 to generate makeup characteristics 124 from input digital images, as described above in relation to FIG. 4. Further, the makeup discrimination network 134 may be incorporated into another application or operating system. In other words, once the makeup discrimination network is generated, the makeup identifier 116 represents a pre-trained system for makeup identification in relation to faces depicted in digital images. In this way, the makeup discrimination network 134 and/or the makeup identifier 116 may be employed as a scalable resource, e.g., over the network 108, capable of utilization by numerous instances of the makeup identification system 106 and/or client devices.

Figure 7:
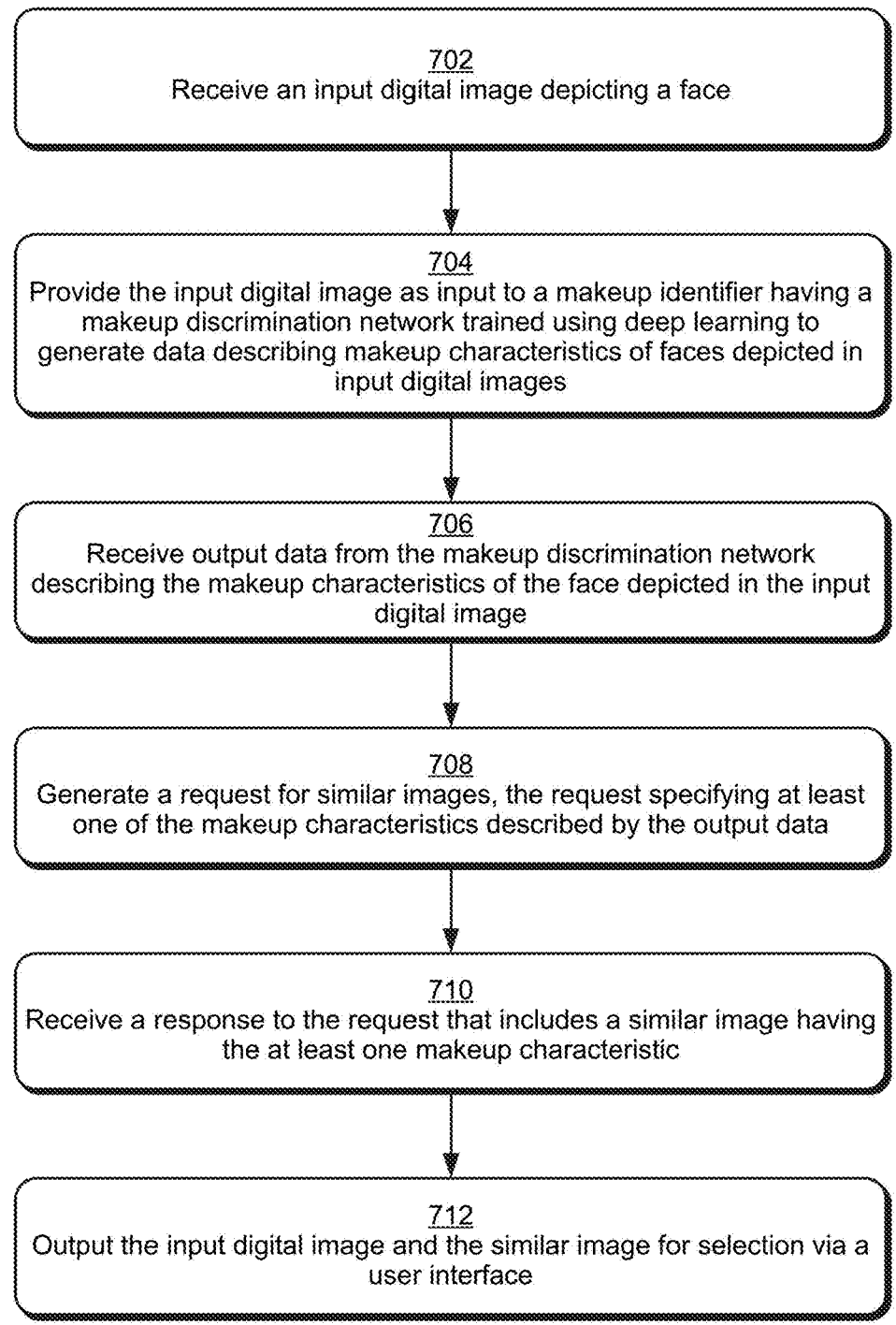
FIG. 7 depicts a procedure in an example implementation in which a neural network trained using deep learning is utilized for identifying makeup characteristics of an input image.

FIG. 7 depicts a procedure 700 in an example implementation in which a neural network trained using deep learning is utilized for identifying makeup characteristics of an input image.

An input digital image depicting a face is received (block 702). By way of example, the client device receives the before image 118 and the after image 120 based on interaction with the user interface 206. The input digital image is provided as input to a makeup discrimination network trained using deep learning to generate data describing makeup characteristics of faces depicted in digital images (block 704). By way of example, the makeup identifier 116 provides data describing visual characteristics of the after image to the makeup discrimination network 134. With regard to training, the makeup discrimination network 134 is trained to generate data describing the makeup characteristics of the after image 120 in accordance with the process described in more detail above. Once trained, the makeup discrimination network 134 identifies and describes a presence or absence of makeup characteristics depicted in input digital images.

Output data is received from the makeup discrimination network describing the makeup characteristics of the face depicted in the input digital image (block 706). For instance, the makeup discrimination network 134 generates the makeup characteristics 124 for the after image 120 and returns the makeup characteristics 124 as output to the makeup identification system 106. In a scenario in which the makeup discrimination network 134 is embedded in the application 112 of the client device 104, the makeup characteristics 124 are returned to the makeup identifier 116.

A request is generated for similar images that specifies at least one of the makeup characteristics described by the output data (block 708). By way of example, the client device 104 receives a selection of one or more of the makeup characteristics 124 presented via the user interface 206. The makeup identifier 116 generates the image request 406 in response to the selection. In particular, the makeup identifier 116 generates the image request 406 to include data indicative of the one or more makeup characteristics 124 selected and communicates the image request 406 to the image search module 114.

A response to the request is received that includes a similar image having at least one makeup characteristic (block 710). By way of example, the client device 104 receives one or more of the similar images 308 that are identified by the image search module 114 based on the specified one or more makeup characteristics included in the image request 406. In particular, the similar images 308 are received over the network 108 from the service provider system 102. The input digital image and the similar image are output for selection via a user interface (block 712). By way of example, the client device 104 displays the after image 120 and the similar images 308 via the user interface 206.

FIG. 8 depicts a procedure 800 in an example implementation in which a network is trained using deep learning to identify and describe makeup characteristics of digital images based on a difference in visual characteristics between before-makeup images and after-makeup images.

A plurality of pairs of digital images depicting faces are received (block 802). In accordance with the principles discussed herein, each of these pairs includes a first image without makeup depicted on a face and a second image with makeup depicted on the face. By way of example, the makeup identification system 106 receives the image pairs 602. Training data is generated describing a difference in visual characteristics between the first and second images of the pairs (block 804). For instance, the image delta module 126 calculates a difference in pixel values between the before image 504 and the after image of the image pairs 602 to generate the training image data 130.

The training data is provided as input to train a makeup discrimination network (block 806). In accordance with the principles discussed herein, the makeup discrimination network is trained to identify and describe makeup characteristics of faces depicted in digital images based on the differences in visual characteristics described by the training data. By way of example, the training manager module 128 provides the training image data 130 to the training manager module 128 to generate the makeup discrimination network 134. The trained makeup discrimination network is output for use by an application to generate data describing the makeup characteristics of a face depicted in an input digital image (block 808). In a scenario where the makeup identifier 116 uses the makeup discrimination network 134 to identify and describe makeup characteristics 124 in the after image 120, the makeup discrimination network 134 represents a trained network configured for generating predictions indicative of an absence or presence of different types of makeup in an input digital image. Further in this example, the makeup discrimination network 134 is output by the makeup identification system 106 and embedded in the makeup identifier 116 at the client device 104.

Having described example procedures in accordance with one or more implementations, consider now an example system and device that can be utilized to implement the various techniques described herein.

Example System and Device

Figure 9:
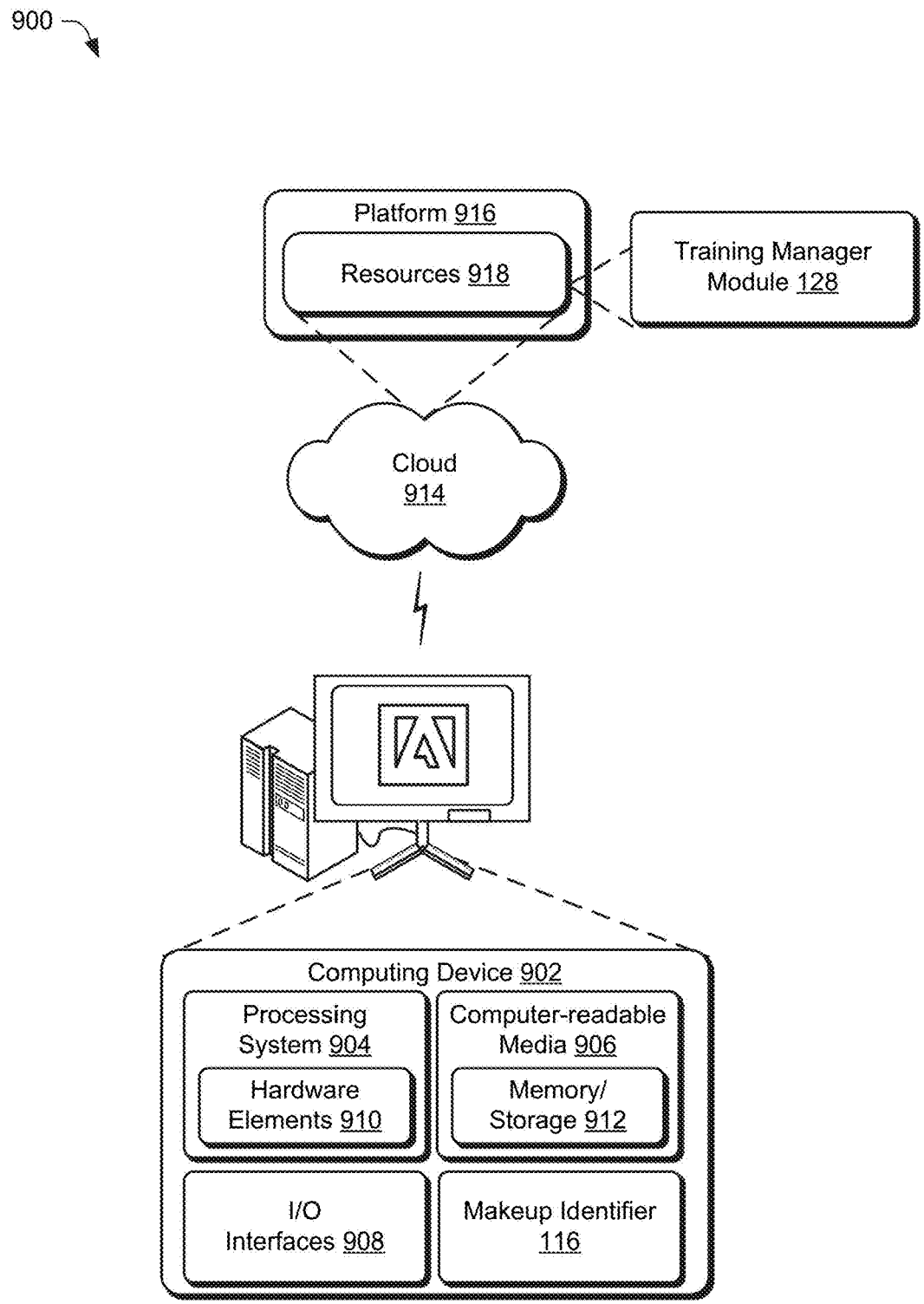
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the makeup identifier 116. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. This is illustrated through inclusion of the training manager module 128. Resources 918 can also include services provided over the Internet and/or through a subscriber network, such as a cellular or Wi-Fi network. The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to present images received in connection with an image search that have desired makeup characteristics, a method implemented by at least one computing device, the method comprising:
   receiving, by the at least one computing device, an input digital image depicting a face;
   providing, by the at least one computing device, the input digital image as input to a makeup discrimination network trained using deep learning to generate data describing makeup characteristics of faces depicted in input digital images;
   receiving, by the at least one computing device, output data from the makeup discrimination network describing the makeup characteristics of the face depicted in the input digital image;
   generating, by the at least one computing device, a search request to return similar images from an image repository, the search request specifying at least one of the makeup characteristics described by the output data;
   receiving, by the at least one computing device, a response to the search request that includes a similar image having the at least one makeup characteristic; and
   outputting, by the at least one computing device, the input digital image and the similar image for selection via a user interface.

2. The method as described in claim 1, wherein the makeup discrimination network is configured for multi-label classification of the input digital image, the multi-label classification using the output data describing the makeup characteristics to associate multiple labels indicative of the makeup characteristics with the input digital image.

3. The method as described in claim 1, wherein the output data describing the makeup characteristics includes labels for one or more of lipstick, lipliner, eye shadow, eyeliner, blush, and foundation.

4. The method as described in claim 1, wherein the output data describing the makeup characteristics indicates a presence or an absence of different types of makeup.

5. The method as described in claim 1, further comprising outputting the input digital image and one or more of the makeup characteristics of the face depicted in the input digital image.

6. The method as described in claim 5, wherein the one or more makeup characteristics of the face are selectable via the user interface for at least one of obtaining further information about a selected characteristic or conducting an image search based, in part, on the selected characteristic.

7. The method as described in claim 1, wherein the output data further describes facial characteristics of the face including at least facial feature locations corresponding to the makeup characteristics.

8. The method as described in claim 1, wherein the makeup discrimination network is trained using pairs of digital images of faces, and each pair depicts a face with application of makeup and the face without the application of makeup.

9. The method as described in claim 1, wherein the method is performed by a digital image editing application of the at least one computing device, the digital image editing application being configured to receive the input digital image and the makeup discrimination network being embedded as part of the digital image editing application.

10. The method as described in claim 1, wherein the search request includes a makeup label and a makeup color for specifying the at least one makeup characteristic.

11. A system comprising:
   at least one processor; and
   memory having stored thereon computer-readable instructions that are executable by the at least one processor to perform operations for presenting images received in connection with an image search that have desired makeup characteristics, the operations including:
      receiving a pair of input digital images, a first of the input digital images depicting a face with application of makeup and a second of the input digital images depicting the face without the application of makeup;
      providing data describing a difference in visual characteristics between the pair of input digital images as input to a makeup discrimination network trained using deep learning to generate output data describing makeup characteristics of the face with the application of makeup;
      receiving the output data from the makeup discrimination network describing the makeup characteristics;
      generating a search request to return similar images from an image repository, the search request specifying at least one of the makeup characteristics described by the output data;
      receiving a response to the search request that includes a similar image depicting a different face with the at least one makeup characteristic; and
      outputting the similar image via a user interface.

12. A system as described in claim 11, wherein the output data describing the makeup characteristics indicates a presence or an absence of makeup labels associated with different types of makeup.

13. A system as described in claim 11, wherein the operations further include outputting the input digital image depicting the face with the application of makeup and one or more of the makeup characteristics described by the output data.

14. A system as described in claim 11, wherein the makeup discrimination network is trained using pairs of with-makeup and without-makeup digital images tagged with one or more makeup labels.

15. A system as described in claim 11, wherein the search request includes a makeup label and a makeup color for specifying the at least one makeup characteristic.

16. In a digital medium environment to train a makeup discrimination network to identify makeup characteristics of faces depicted in digital images, a method implemented by a computing device, the method comprising:
   receiving, by the computing device, a plurality of pairs of digital images depicting faces, each pair comprising a first image without makeup depicted on a face and a second image with makeup depicted on a face;

generating, by the computing device, training data describing a difference in visual characteristics between the first and second images of the pairs;

providing, by the computing device, the training data as input to a neural network to train the neural network to identify and describe makeup characteristics of faces depicted in digital images based on described differences between the pairs; and outputting, by the computing device and based on the providing, a trained neural network for use by an image editing application in which the trained neural network is embedded to generate data describing the makeup characteristics of a face depicted in an input digital image.

17. The method as described in claim 16, wherein the training data includes makeup tags associated with the plurality of pairs of digital images.

18. The method as described in claim 16, further comprising embedding the trained neural network as part of the image editing application.

19. The method as described in claim 16, wherein generating the training data includes subtracting pixel values for the first image from pixel values for the second image.

20. The method as described in claim 16, wherein the neural network is a convolutional neural network configured for multi-label makeup classification.

* * * * *

UNITED STATES PATENT AND TRADEMARK OFFICE
CERTIFICATE OF CORRECTION

PATENT NO. : 10,755,447 B2  
APPLICATION NO. : 15/994837  
DATED : August 25, 2020  
INVENTOR(S) : Chhaya et al.

Page 1 of 1

It is certified that error appears in the above-identified patent and that said Letters Patent is hereby corrected as shown below:

On the Title Page

After item (65), entitled "Prior Publication Data", insert paragraph below entitled:  
--Foreign Application Priority Data  
April 19, 2018 (IN) 201811014802--.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*